(No Model.)
T. MILLER.
COFFEE OR TEA URN.
No. 486,881. Patented Nov. 29, 1892.
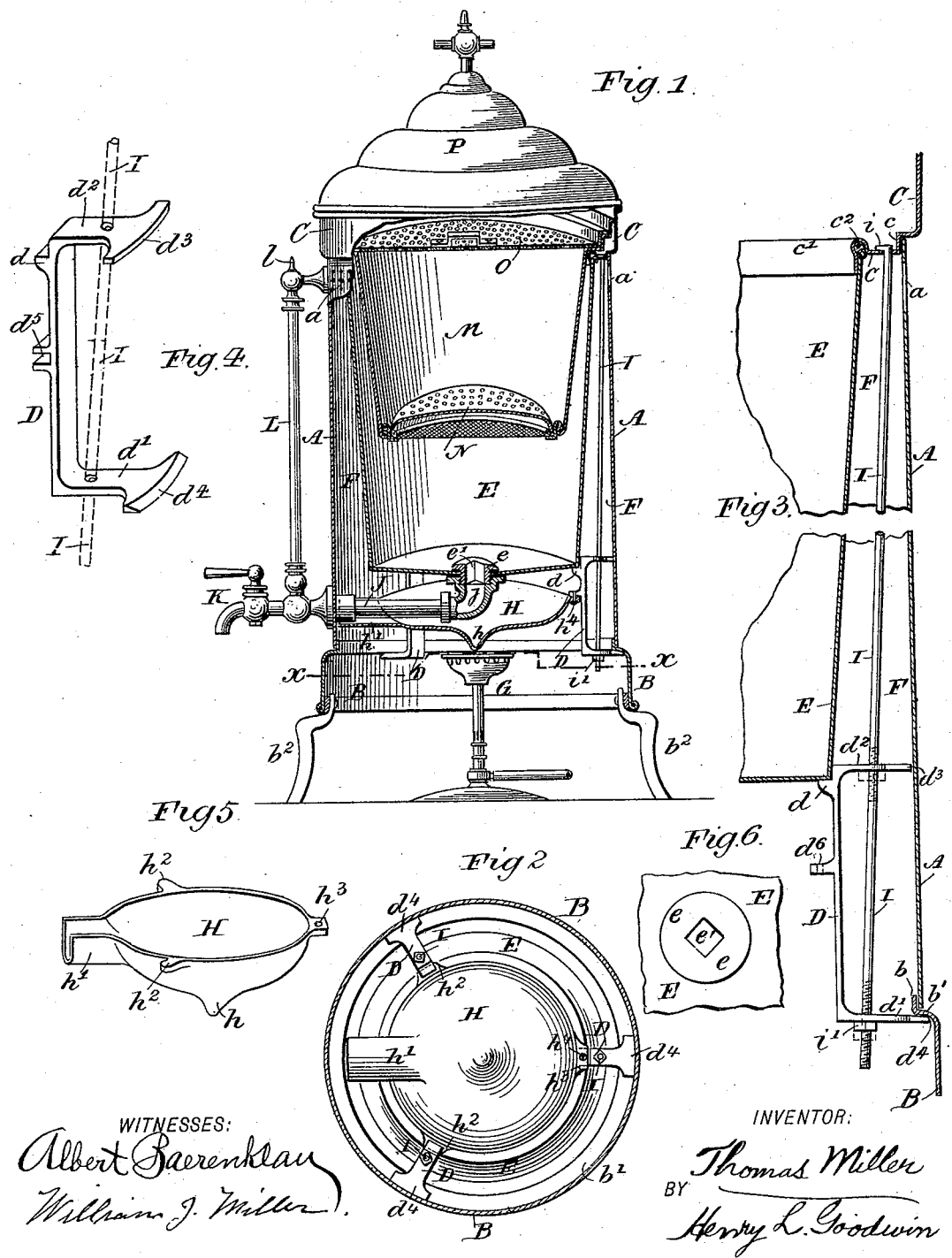

UNITED STATES PATENT OFFICE.

THOMAS MILLER, OF JERSEY CITY, NEW JERSEY.

COFFEE OR TEA URN.

SPECIFICATION forming part of Letters Patent No. 486,881, dated November 29, 1892.

Application filed February 16, 1892. Serial No. 421,750. (No model.)

*To all whom it may concern:*

Be it known that I, THOMAS MILLER, of Jersey City, in the county of Hudson and State of New Jersey, have invented certain new and useful Improvements in Coffee or Tea Urns, of which the following is a full, clear, and exact description.

My invention relates to urns of that class used in hotels, restaurants, and families for making coffee, tea, or other beverages.

The invention has for its object to simplify the construction of urns of this character in a manner promoting economy in manufacture and reduced selling price as compared with urns heretofore made and in which the beverage-receptacle is sustained within a water-jacketing vessel held within the outside casing.

A further object is to assure economy in the use of gas, oil, or other fuel used to heat the beverage in the urn, and all while at the same time providing for convenient renewal of the beverage-receptacle and other parts when they are worn out by use or are accidentally or otherwise unfitted for service.

The invention will first be particularly described, and then will be defined in claims hereinafter set forth.

Reference is to be had to the accompanying drawings, forming a part of this specification, in which similar letters of reference indicate corresponding parts in the several figures.

Figure 1 is a vertical sectional view of my improved urn. Fig. 2 is a bottom plan view thereof, in section, on the line $x\,x$ in Fig. 1. Fig. 3 is an enlarged broken detail sectional elevation of side portions of the urn body or casing, its beverage-receptacle, and their bolt-clamp connections. Fig. 4 is a perspective view of one of the clamps, the bolt being partly shown in dotted lines. Fig. 5 is a perspective view of the heat deflector and guard of the beverage-receptacle and its outlet, and Fig. 6 is a detail plan view of the bottom outlet of the beverage-receptacle.

The urn is made with a casing having an outer body or shell A, which is preferably cylindrical and is sustained on a base-piece B, having legs or feet $b^2$, supporting the urn at proper height. Upon the body A rests the casing head-piece C, said parts B C having vertical shoulders or flanges $b\,c$, respectively fitting within the body and centering the parts A B C relatively to each other.

Within the body A and between the head-piece C and a series (preferably three) of clamps D is supported the beverage-receptacle E, which is sufficiently smaller in diameter and is preferably tapered downward to provide between the body A and the receptacle a hot-air space F, into which pass the products of combustion from a gas or oil burner G after said products escape upward around the periphery of a deflector or guard-plate H, which is interposed between the burner and receptacle and prevents overheating of the bottom of the latter and the lower strata of fluid it contains, and thus promotes equable heating of the entire body of fluid in the urn.

The deflector H is preferably sustained by or from the clamps D, which are in turn supported from the urn body or casing by a series of bolts I, one of which passes through each clamp. Each bolt has a head $i$ above the head-piece C, through which it passes, and a nut $i'$, which is preferably below the lower lateral arm $d'$ of the clamp, as shown in full lines in Figs. 1 and 3 of the drawings. Thus arranged the bolt passes through both the lower arm $d'$ and the upper arm $d^2$ of the clamp; but it is obvious that the bolt may be made shorter to receive the nut below the upper clamp-arm $d^2$, as indicated by dotted lines in Fig. 3 of the drawings. The longer bolts are preferred in practice, as by passing them through both upper and lower arms of the clamps increased steadiness of the parts and stability of the urn are promoted.

In the preferred construction each clamp D, besides the aforesaid arms $d'\,d^2$, is provided at its inner face or wall and below its upper end or arm $d^2$ with a lug or lip $d$, whereby a recess or rabbet is formed at the upper inner corner of the clamp to receive the lower corner or angle of the beverage-receptacle E, which thus is centrally sustained between the lugs $d$ of all the clamps and the inner portion $c'$ of the head-piece C, which part $c'$ is preferably flanged and finally tooled down at the inner face of the receptacle. Each of the clamps D is also preferably fitted by the outer edge or shoulder $d^3$ of its upper arm $d^2$ against the inner face of the main body or shell A, while the lower arm $d'$ of the clamp extends outward below the base-piece flange $b$ and beneath a horizontal flange or face $b'$ of the base-piece.

In assembling the main parts A, B, C, and E of the urn the bolts I are slipped through the casing head-piece C and are preferably soldered thereto at their heads $i$. The head-piece then is inverted and the urn-body A is set onto it and outside the vertical flange $c$, and after the beverage-receptacle is laid top downward upon the head-piece outside of its inner flange at $c'$, and preferably upon an interposed packing $c^2$ the base-piece B is slipped onto the body A with its flange $b$ inside, whereupon the clamps D are slipped onto the bolts I until their lugs $d$ bear on the bottom of the receptacle E, while the edges $d^3$ of the clamp-arms $d^2$ bear against the inner face of the urn-body A, and the ends $d^4$ of the clamp-arms $d'$ bear upon the horizontal flange portion $b'$ of the base B. The bolt-nuts $i'$ now are applied, and, if desired, lock-nuts may be used outside of them, as indicated by dotted lines in Fig. 3 of the drawings. It is manifest that when the parts are thus secured by the bolt-clamps a most substantial connection of the urn body or shell, the base-piece, the head-piece, and the beverage-receptacle is assured and that they are all held relatively central to each other and quite as firmly as if they were soldered or otherwise rigidly fastened together, while at the same time allowing the beverage-receptacle when worn out or damaged to be quickly and conveniently replaced by a new receptacle. This may be done by inverting the urn and removing the bolt-nuts $i'$ and the clamps D and other fittings, later described, and after the new receptacle is set in place the clamps and bolt-nuts will again be adjusted to lock the parts together, and the urn is practically as good as new. It is not essential that the clamps D have upper shoulders $d^3$ abutting the urn-body A, as the lower shoulders or parts $d'$ $d^4$ of the clamps would, with the clamp-lugs $d$, afford a good fastening for the parts A B C E in central relation with each other; but the clamps having said shoulders $d^3$ are preferred, because they assure a steadier and more substantial adjustment of the several detachable parts.

The peculiarly-formed clamps D are provided in order to make room below the beverage-receptacle E and within the urn-casing for the heat-deflector H, while at the same time the clamps and bolts serve as an effective means for connecting the parts A B C E in the manner above described. The parts A B C of the casing may be soldered together, if desired, but the use of the bolt-clamps makes this quite-expensive operation unnecessary and also allows replacement or renewal of any one of the parts A B C of the casing. Hence the detachable arrangement of these parts is preferred in practice. The heat-deflector H is adjusted under the beverage-receptacle after the parts A B C E are secured by the bolt-clamps, as above described, and the deflector will of course be removed first when renewing the beverage-receptacle.

Before particularly describing the deflector H attention is called to the peculiar form of the flat-flanged screw-coupling $e$, which is at the bottom of the beverage-receptacle E and engages the flanged elbow-fitting $j$ of the beverage discharge-pipe J of the urn, asbestos or other suitable washers being used between the flanges of the parts $e\ j$ and opposite faces of the receptacle-bottom to assure tightly-packed and durable joints. The opening $e'$ of the coupling $e$, which gives outlet of the beverage to the pipe $j$ J, is made square or flat-sided expressly to allow a key-wrench of like general form to be inserted to conveniently screw and unscrew the coupling for fastening or unfastening the outlet connections of the beverage-receptacle without the use of high nuts at the inside of the receptacle. The low or thin flanged coupling $e$ allows drainage or flow of quite the whole of the beverage from the receptacle, and thus avoids waste, which would occur were a higher or thicker coupling used to couple the outlet-pipe to the receptacle. The pipe J communicates with the tap or faucet K, through which the beverage is drawn off for use. To the faucet is connected a gage-glass L, which is coupled at $l$ to the upper part of the receptacle and indicates the height of the beverage therein. When the urn-receptacle is renewed, as above described, the parts $e\ j$ J K L $l$ can readily be removed and used again with the new receptacle.

The usual coffee or tea steeping vessel M, provided with one or more removable bottom strainers N and a top water-percolating plate O, is shown in the beverage-receptacle E; but these parts M N O and the cover P, applied to the urn head-piece, form no part of my present invention.

The heat-deflector H is peculiarly formed, preferably in one piece, of cast metal, and with a pendent central stem or projection $h$, which serves as a stop, limiting too close approach of the head of the burner G, and thereby obviating burning out of the deflector by the burner-flame. The deflector also has a lateral projection or extension $h'$, which preferably has a semicircular or trough-like form and lies directly below the discharge-pipe J and extends quite to the wall of the urn-body A. This projection $h'$ prevents overheating by the burner G of the pipe J and the beverage it contains, and thus promotes durability of the burner-outlet and materially assists the main body of the deflector in preserving an equal temperature of the entire body or volume of beverage or substance in the urn-receptacle E. The main body portion of the deflector is preferably a little smaller in diameter than the bottom of the beverage-receptacle, which it protects from direct impact of the flame of the burner. The main portion of the deflector is preferably made in dished or bowl form with a bottom curving upward and outward toward its periphery, past which the hot products from the burner escape upward into the hot-air space F within the casing and around the entire body of the beverage-receptacle to heat its contents effectively and evenly without burning the beverage and with a very marked economy of fuel over that required to heat an auxiliary jacketing-vessel holding water in which the beverage-receptacle has heretofore been placed by me to prevent burning its contents. Surplus hot products pass from the space F through contracted openings $a$ at or near the top of the urn body or shell A. This deflector H, having the lateral guard $h'$, may be held in approximately the position shown in Figs. 1 and 2 of the drawings by any suitable means—such, for instance, as a connection to the outlet-pipe $j$ J; but I prefer to more effectively support the deflector from its periphery and by means of the bolt-clamps D, above described. This is done by providing the clamps with lugs, which engage corresponding lugs on the deflector. I prefer to provide the two clamps nearest the beverage-outlet pipe J each with a pair of lugs $d^5$, between which a lug $h^2$ on the deflector is slipped, while the third clamp has or may have but one lug $d^6$, on which lies a third lug $h^3$ of the deflector, and whereby one screw $h^4$, passed into the lugs $h^3$ $d^6$, holds the deflector securely in place, while allowing its quick removal when the beverage-receptacle E is to be replaced by a new one.

Another important advantage following the use of the deflector between the burner and the beverage-receptacle and the dispensing with the usual water-jacketing vessel around the receptacle is that but one gage-glass L is needed for the beverage itself and the extra gage-glass and fittings commonly used for the water-jacketing receptacle are not required, as will readily be understood.

Having thus fully described my invention, I claim as new and desire to secure by Letters Patent—

1. An urn made with a casing, a beverage-receptacle therein, clamps having an upper lug or shoulder engaging the beverage-receptacle and provided with a lower arm clasping the casing, and bolts engaging the clamps and casing, substantially as described.

2. An urn made with a body or shell, a detachable head-piece and detachable base-piece adapted thereto, a beverage-receptacle within the body, clamps having an upper lug or shoulder engaging the beverage-receptacle and provided with a lower arm clasping the base-piece, and bolts passed through the head-piece and engaging the clamps, substantially as described.

3. An urn made with a casing, a beverage-receptacle therein, clamps having an upper lug or shoulder engaging the beverage-receptacle and also having an upper shoulder abutting the casing, said clamps also having a lower arm clasping the casing, and bolts engaging the casing and clamps, substantially as described.

4. An urn made with a body or shell, a detachable head-piece and a detachable base-piece, a beverage-receptacle within the body, clamps having an upper lug or shoulder engaging the beverage-receptacle and also having an upper shoulder abutting the body or shell, said clamps also having a lower arm clasping the base-piece, and bolts engaging the head-piece and the clamps, substantially as described.

5. An urn made with a casing, a beverage-receptacle therein, a burner below the receptacle, and a heat-deflector interposed between the receptacle and burner and having a pendent stop limiting approach of the burner, substantially as described.

6. An urn made with a casing, a beverage-receptacle therein, a lateral outlet for the beverage from the receptacle, a burner below the receptacle, and a heat-deflector interposed between the receptacle and burner and having a lateral projection or extension guarding the beverage-outlet, substantially as described.

7. An urn made with a casing, a beverage-receptacle therein, clamps having an upper lug or shoulder engaging the beverage-receptacle and provided with a lower arm clasping the casing, a burner below the beverage-receptacle, and a removable heat-deflector interposed between the burner and receptacle and sustained by or from the clamps, substantially as described.

8. The clamp D, having shoulder $d$ and lugs $d^5$ $d^6$, combined with the urn-casing and the beverage-receptacle adapted to the shoulders $d$, a removable heat-deflector having lugs adapted to the clamp-lugs $d^5$ $d^6$, and a fastening device for the deflector at the lug $d^6$, substantially as described.

9. The clamp D, provided with a shoulder $d$ and lower and upper bolt-receiving arms $d'$ $d^2$, having shoulders or bearings $d^4$ $d^3$, respectively, substantially as described.

10. The clamp D, provided with a shoulder $d$, lower and upper bolt-receiving arms $d'$ $d^2$, having shoulders or bearings $d^4$ $d^3$, respectively, and lugs to which a removable heat-deflector is adapted, substantially as described.

THOMAS MILLER.

Witnesses:
ALBERT BAERENKLAU,
WILLIAM I. MILLER.